(12) United States Patent
Mittag et al.

(10) Patent No.: US 12,152,679 B2
(45) Date of Patent: Nov. 26, 2024

(54) METHOD FOR ASSEMBLING A NEEDLE VALVE

(71) Applicant: Atlas Copco IAS GmbH, Bretten (DE)

(72) Inventors: Sten Mittag, Karlsruhe (DE); Bernhard Sauer, Oelbronn-Duerrn (DE)

(73) Assignee: Atlas Copco IAS GmbH, Bretten (DE)

( * ) Notice: Subject to any disclaimer, the term of this patent is extended or adjusted under 35 U.S.C. 154(b) by 0 days.

(21) Appl. No.: 18/022,451

(22) PCT Filed: Jul. 28, 2021

(86) PCT No.: PCT/EP2021/071124
§ 371 (c)(1),
(2) Date: Feb. 21, 2023

(87) PCT Pub. No.: WO2022/058077
PCT Pub. Date: Mar. 24, 2022

(65) Prior Publication Data
US 2023/0313891 A1    Oct. 5, 2023

(30) Foreign Application Priority Data
Sep. 15, 2020  (DE) ............... 10 2020 123 966.1

(51) Int. Cl.
*F16K 1/42* (2006.01)
*F16K 1/36* (2006.01)
*F16K 27/02* (2006.01)

(52) U.S. Cl.
CPC ............ *F16K 1/427* (2013.01); *F16K 1/36* (2013.01); *F16K 27/02* (2013.01); *F16K 2200/102* (2021.08)

(58) Field of Classification Search
CPC . F16K 1/427; F16K 1/36; F16K 27/02; F16K 2200/102
(Continued)

(56) References Cited

U.S. PATENT DOCUMENTS 4,114,851 A * 9/1978 Shivak ...................... F16K 1/38
251/360
5,145,689 A     9/1992 Allen et al.
(Continued)

FOREIGN PATENT DOCUMENTS

DE    196 21 835 A1    12/1997
DE    691 26 667 T2     1/1998
(Continued)

OTHER PUBLICATIONS

International Search Report in PCT/EP2021/071124, mailed Nov. 18, 2021.
(Continued)

*Primary Examiner* — John Bastianelli
(74) *Attorney, Agent, or Firm* — Collard & Roe, P.C.

(57) ABSTRACT

In a method for assembling a needle valve having a housing, at least one valve needle longitudinally displaceably guided in the housing in a first spatial direction, and at least one valve seat plate, the plate for each needle has a valve seat associated with the needle, at which seat an outlet opening for a fluid can be closed and opened by back and forth movement of the relevant needle. In a first step the plate is fastened to the housing by a fastener such that it has limited movement with respect to the housing. In a second step each needle is set into a back and forth movement in which it is alternatingly placed onto and lifted up from the associated seat. In a third step the plate is fixed on the housing while the at least one needle moves back and forth.

13 Claims, 1 Drawing Sheet

(58) Field of Classification Search
USPC .......................................... 251/359–360, 122
See application file for complete search history.

(56) References Cited

U.S. PATENT DOCUMENTS

| | | | |
|---|---|---|---|
| 5,618,566 A | 4/1997 | Allen et al. | |
| 6,073,864 A | 6/2000 | Berghoff et al. | |
| 6,799,702 B1* | 10/2004 | Mercer | B05C 5/0225 |
| | | | 251/363 |
| 7,168,678 B2* | 1/2007 | Schaupp | F16K 27/0254 |
| | | | 251/360 |
| 7,617,955 B2* | 11/2009 | Riney | B05C 5/0225 |
| | | | 222/509 |
| 7,837,071 B2* | 11/2010 | Achrainer | B05B 1/3053 |
| | | | 251/129.21 |
| 8,186,646 B2* | 5/2012 | Geelhart | F16K 1/422 |
| | | | 251/360 |
| 8,893,930 B2* | 11/2014 | Tix | B05C 11/1047 |
| | | | 210/429 |
| 9,314,812 B2* | 4/2016 | Clark | B23K 3/0623 |
| 2009/0107398 A1 | 4/2009 | Hassler, Jr. et al. | |
| 2019/0234230 A1* | 8/2019 | Nishiyama | F01D 17/145 |
| 2019/0337008 A1 | 11/2019 | Gould et al. | |
| 2021/0146397 A1 | 5/2021 | Mittag et al. | |

FOREIGN PATENT DOCUMENTS

| | | |
|---|---|---|
| DE | 10 2012 211 327 A1 | 1/2014 |
| DE | 10 2018 108 915 A1 | 10/2019 |

OTHER PUBLICATIONS

German Office Action in DE 10 2020 123 966.1, dated May 26, 2021, with English translation of relevant parts.
English Translation of International Preliminary Report on Patentability in PCT/EP2021/071124, mailed Mar. 30, 2023.

* cited by examiner

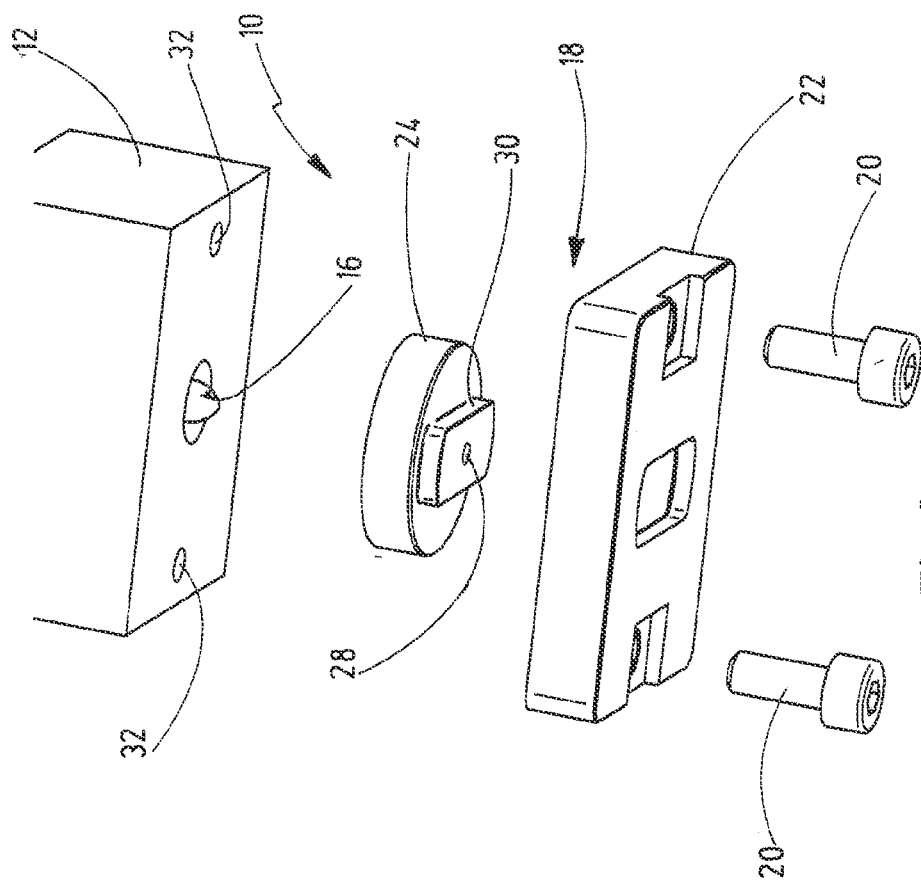
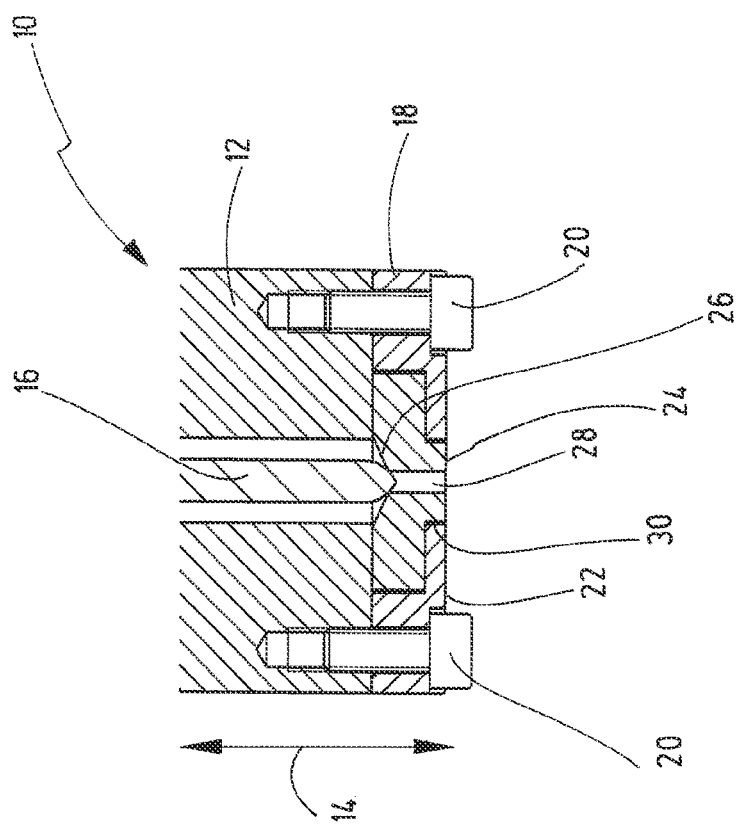

METHOD FOR ASSEMBLING A NEEDLE VALVE

CROSS REFERENCE TO RELATED APPLICATIONS

This application is the National Stage of PCT/EP2021/071124 filed on Jul. 28, 2021, which claims priority under 35 U.S.C. § 119 of German Application No. 10 2020 123 966.1 filed on Sep. 15, 2020, the disclosure of which is incorporated by reference. The international application under PCT article 21(2) was not published in English.

The invention relates to a method for assembly of a needle valve, in accordance with the preamble of claim 1.

Needle valves having one or more valve needles and a corresponding number of valve seats are used, for example, in order to apply fluids, such as, for example, adhesives, sealants, insulation materials or other viscous materials to workpieces with great precision, in the form of material lines or material dots. In this regard, thinner valve needles are increasingly being used, which close off correspondingly small outlet openings at the valve seat assigned to them, in each instance. The use of such valve needles having small diameters and correspondingly small valve seats makes great demands on the precision during assembly of the needle valves. In particular, it is difficult to position and fix in place the valve seat in question, with reference to the assigned valve needle, in such a manner that the valve needle can sit on the seat so precisely that a good sealing effect is guaranteed.

It is therefore the task of the invention to make available a method for assembly of a needle valve, which method allows better positioning of the valve seat or of the valve seats with reference to the valve needle(s).

This task is accomplished, according to the invention, by means of a method having the characteristics of claim 1. Advantageous further developments of the invention are the object of the dependent claims.

The invention is based on the recognition, found by the applicant in experiments, that self-centering of a valve seat with reference to the valve needle assigned to it can take place if the valve needle performs an oscillating movement during fixation onto the housing, in which the valve needle is guided to be longitudinally displaceable, of a valve seat plate that carries the valve seat, which movement corresponds to the movement that it performs during operation, when it is lifted up from the valve seat and set down onto it, again and again, at regular intervals. In a first step, the valve seat plate is fastened onto the housing by means of fastening means. Contrary to the usual method of procedure, however, the valve seat plate is not fixed in place on the housing during the first step, but rather fastened on only to such an extent that is still has limited mobility with reference to the housing. Then, in a second step, each valve needle is put into oscillating motion, and in a third step the valve seat plate is fixed in place on the housing, while the valve needle(s) move(s) back and forth.

It is preferred that the at least one valve needle is moved back and forth at a frequency of 10 Hz to 100 Hz, preferably of 30 Hz to 70 Hz, and further preferably of 45 Hz to 55 Hz, since frequencies around 50 Hz have proven to be most effective. It is practical if after the first step, the valve seat plate is fixed in place with reference to the housing in the first spatial direction, while is remains mobile, in a limited manner, in the two other spatial directions. It can then move away to the side, so as to be able to center every valve seat with reference to the related valve needle. It is practical if the fastening means are screws that are passed through the valve seat plate, which are screwed into the housing until a first torque is reached during the first step, and until a greater second torque is reached during the third step.

Hard metal is preferred as the material for each valve needle and each valve seat. Hard metal is chemically resistant to the materials for the application of which the needle valve is regularly used. A hard metal is understood to be a metal matrix composite material, in which the hard substances that are present in particle form are held together by means of a matrix composed of metal. In particular, metal carbides or metal nitrides, such as tungsten carbide, titanium carbide, titanium nitride, niobium carbide, tantalum carbide or vanadium carbide, for example, are used as hard substances. It is then furthermore preferred that the valve seat plate has a base plate composed of metal, preferably of stainless steel, which carries the at least one valve seat. In particular, all the valve seats can be brought together in one piece to form a component composed of hard metal that is held in the base plate, which in turn is fastened to the housing. Stainless steel, in particular, demonstrates great elasticity, which is advantageous during fixation on the housing in the third step, while hard metal is more brittle. If screws are used for fixation on the housing, it is advantageous if these are passed through the base plate.

The needle valve can be equipped with just one valve needle and one valve seat. However, it is preferred that it has multiple valve needles that extend parallel to one another in the first spatial direction, which needles are preferably arranged in a row, in the sense that a straight line that extends perpendicular to the first spatial direction can be laid through all the valve needles.

In the following, the invention will be explained in greater detail using an exemplary embodiment shown schematically in the drawing. The figures show:

FIG. 1 a schematic sectional representation of a needle valve, and

FIG. 2 an exploded view of the needle valve according to FIG. 1.

In FIG. 1, a needle valve 10 is schematically shown in section; it has a housing 12 and a valve needle 16 composed of hard metal, which is guided to be longitudinally displaceable in the housing 12 in a first spatial direction 14. A valve seat plate 18 is fixed in place on the housing 12 by means of fastening means 20, which are screws 20 in the exemplary embodiment shown here. The valve seat plate 18 has a base plate 22 composed of stainless steel, as well as a valve seat block 24 having a valve seat 26 assigned to the valve needle 16, on which seat an outlet opening 28 for a fluid that can be applied by means of the needle valve 10 can be closed and opened by means of moving the valve needle 16 back and forth, as well as by lifting it up from and setting it down onto the valve seat 26, in a limited manner. The valve seat block 24 is held in the base plate 22 and has a step 30, so that it can be inserted into the base plate 22 only from the side that faces the housing 12. It is produced in one piece from the same hard metal as the valve needle 16.

During assembly of the needle valve 10 from the individual parts shown in FIG. 2, first the valve seat block 24 is set into the base plate 22 and with it forms the valve seat plate 18. This plate is laid against the housing 12 from below, and the screws 20 are passed through the base plate 22 and screwed into screw holes 32 in the housing, which holes are provided with a thread, until they have a first predetermined torque applied to them. The valve seat plate 18 then lies against the housing 12 in a practically immovable manner, in the first spatial direction 14, but still has some play in the two other spatial directions, which stand perpendicular to the first spatial direction 14 and to one another. The valve needle 16 is then put into oscillating motion, which is equal to consecutive opening and closing of the needle valve 10 at a frequency of approximately 50 Hz. During this oscillating movement of the valve needle 16, the screws 20 are tightened until a predetermined second torque is applied, which is greater than the first torque. During tightening of the screws 20, the constant lifting of the valve needle 16 from the valve seat 26 and the subsequent setting down bring about self-centering of the valve seat 26 with reference to the valve needle 16, so that the valve seat 26 can be positioned very precisely with regard to the valve needle 16.

In the exemplary embodiment shown, the valve needle 10 only has one valve needle 16 and the related valve seat 26. It is understood that the method according to the invention can also be used for needle valves that have multiple valve needles and a valve seat for every valve needle. In this regard, the valve seat block has several valve seats arranged in a row, for example, while the method of construction of the needle valve demonstrates essentially the same method as in the drawing.

In summary, the following should be stated: The invention relates to a method for assembly of a needle valve 10, which has a housing 12, at least one valve needle 16 that is guided in the housing 12 to be longitudinally displaceable in a first spatial direction 14, and a valve seat plate 18, wherein the valve seat plate 18 has a valve seat 26 for each valve needle 16, assigned to the latter, on which seat an outlet opening 28 for a fluid can be closed and opened by means of a back and forth movement of the valve needle 16 in question. According to the invention, it is provided that in a first step, the valve seat plate 18 is fastened to the housing 12 by means of fastening means 20, so that it has limited mobility with reference to the housing 12, that in a second step, each valve needle 16 is put into a back and forth motion, during which it is alternately set onto the valve seat 26 assigned to it and lifted up from it, and that in a third step, the valve seat plate 18 is fixed in place on the housing 12 while the at least one valve needle 16 moves back and forth.

The invention claimed is:

1. A method for assembly of a needle valve (10), which has a housing (12), at least one valve needle (16) that is guided in the housing (12) to be longitudinally displaceable in a first spatial direction (14), and a valve seat plate (18), wherein the valve seat plate (18) has a valve seat (26) for each valve needle (16), assigned to the valve seat (26), on which seat an outlet opening (28) for a fluid can be closed and opened using a back and forth movement of the valve needle (16),
wherein in a first step, the valve seat plate (18) is fastened to the housing (12) so that the valve seat plate (18) has limited mobility with reference to the housing (12),
wherein in a second step, each valve needle (16) is put into a back and forth motion, during which the valve needle (16) is alternately set onto the valve seat (26) assigned to the valve needle (16) and lifted up from the valve seat (26) assigned to the valve needle (16) multiple times, and
wherein in a third step, the valve seat plate (18) is fixed in place on the housing (12) while the at least one valve needle (16) moves back and forth multiple times.

2. The method according to claim 1, wherein the at least one valve needle (16) is moved back and forth at a frequency of 10 Hz to 100 Hz.

3. The method according to claim 1, wherein after the first step, the valve seat plate (18) is fixed in place in the first spatial direction (14) with reference to the housing (12), and has limited mobility in the two other spatial directions.

4. The method according to claim 1, wherein the valve seat plate (18) is fastened to the housing (12) using screws that are passed through the valve seat plate (18), which are screwed into the housing (12) until a first torque is reached during the first step, and until a greater second torque is reached during the third step.

5. The method according to claim 1, wherein each valve needle (16) and each valve seat (26) are produced from hard metal.

6. The method according to claim 5, wherein the valve seat plate (18) carries a base plate (22) composed of metal, which carries the at least one valve seat (26).

7. The method according to claim 1, wherein the needle valve (10) has multiple valve needles (16) that extend parallel to one another in the first spatial direction.

8. The method according to claim 7, wherein the valve needles (16) are arranged in a row.

9. The method according to claim 1, wherein the at least one valve needle (16) is moved back and forth at a frequency of 30 Hz to 70 Hz.

10. The method according to claim 1, wherein the at least one valve needle (16) is moved back and forth at a frequency of 45 Hz to 55 Hz.

11. The method according to claim 6, wherein the base plate is composed of stainless steel.

12. A method for assembling a needle valve having a housing, a valve needle guided in the housing and longitudinally displaceable in a first spatial direction and a valve seat plate wherein the valve seat plate has a valve seat for the valve needle assigned to the valve seat and the valve seat has an outlet opening for a fluid which outlet opening is closed and opened via a back and forth movement of the valve needle, the method comprising the steps of:
fastening the valve seat plate to the housing so that the valve seat plate has limited mobility with reference to the housing;
putting the valve needle into an oscillating back and forth motion, during which oscillating back and forth motion, the valve needle is alternately set onto the valve seat assigned to the valve needle and lifted up from the valve seat assigned to the valve needle multiple times; and
fixing the valve seat plate in place on the housing while the valve needle is oscillating in the oscillating back and forth motion.

13. The method according to claim 12, wherein the needle valve comprises a plurality of valve needles and a plurality of valve seats, wherein each valve seat of the plurality of valve seats is assigned to a respective valve needle of the plurality of valve needles, and
wherein each of the plurality of valve needles is put into an oscillating back and forth motion, during which oscillating back and forth motion, a respective valve needle of the plurality of valve needles is alternately set onto the valve seat assigned to the respective valve needle and lifted up from the valve seat assigned to the respective valve needle.

* * * * *